United States Patent
Sugaya (10) Patent No.: US 9,743,050 B2
(45) Date of Patent: Aug. 22, 2017

(54) USER TERMINAL AND SYSTEM AND METHOD FOR CORRECTING COLOR

(71) Applicant: OPTiM Corporation, Saga (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 14/982,222

(22) Filed: Dec. 29, 2015

(65) Prior Publication Data
US 2017/0078633 A1   Mar. 16, 2017

(30) Foreign Application Priority Data

Sep. 15, 2015 (JP) ................. 2015-181525

(51) Int. Cl.
H04N 9/07 (2006.01)
H04N 1/60 (2006.01)

(52) U.S. Cl.
CPC .......... *H04N 9/07* (2013.01); *H04N 1/6047* (2013.01)

(58) Field of Classification Search
CPC ................. H04N 9/646; H04N 9/07
See application file for complete search history.

(56) References Cited

U.S. PATENT DOCUMENTS

| | | | |
|---|---|---|---|
| 8,218,857 B2* | 7/2012 | Moriyama | G01C 15/02 382/154 |
| 9,093,007 B2* | 7/2015 | Berglund | G09G 5/00 |
| 9,398,277 B2* | 7/2016 | Ikeda | H04N 9/3182 |
| 2007/0091174 A1* | 4/2007 | Kochi | G01B 11/2509 348/135 |
| 2013/0113975 A1* | 5/2013 | Gabris | G03B 17/54 348/333.1 |

FOREIGN PATENT DOCUMENTS

JP      2007-158701     6/2007

* cited by examiner

*Primary Examiner* — James Hannett
(74) *Attorney, Agent, or Firm* — Lex IP Meister, PLLC (57) ABSTRACT

The present invention is to provide a user terminal and a system and a method for correcting a color that improve the convenience by displaying an actual taken image and an image displayed on a display device in same colors. The user terminal includes a camera that takes an image of an object; a display device that displays the object; extracts color image data output when the camera takes an image of a color sample as a color reference provided on the object; compares the extracted color image data with the color of an original color sample; and corrects the color of the object displayed on the display device as a result of a comparison.

6 Claims, 9 Drawing Sheets

COLOR DATABASE

| COLOR SAMPLE | RGB VALUE |
|---|---|
| ⬡ | AAA,YYY,ZZZ |
| ⬡ | AAB,YYY,ZZZ |
| ⬡ | AAC,YYY,ZZZ |
| ⋮ | ⋮ |
| ⬡ | ZZZ,ZZZ,ZZZ |

USER TERMINAL AND SYSTEM AND METHOD FOR CORRECTING COLOR

CROSS REFERENCE TO RELATED APPLICATIONS

This application claims priority to Japanese Patent Application No. 2015-181525 filed on Sep. 15, 2015, the entire contents of which are incorporated by reference herein.

TECHNICAL FIELD

The present invention relates to a user terminal including a camera that takes an image of an object and a display device that displays this object, and a system and a method for correcting a color.

BACKGROUND ART

Recent years, images such as still and moving images, taken by an imaging device such as a camera have been known to be analyzed to correct colors in the images.

For example, Patent Document 1 discloses that the image data of a taken image are subjected to colorimetry and corrected based on this colorimetric data.

CITATION LIST

Patent Literature

Patent Document 1: JP 2007-158701 A

SUMMARY OF INVENTION

In the constitution of the invention of Patent Document 1, a position for colorimetry is selected from more than one position within an imaging range, and colorimetric data is output based on a light from this position for colorimetry. Then, the color of the image data of a taken image is corrected. However, since color display varies by a display device that displays a taken image, colors may be different between an actual taken image and an image displayed on a display device.

Therefore, the present invention pays an attention to the correction of the difference in color between an actual taken image and an image displayed in a display device.

An objective of the present invention is to provide a user terminal and a system and a method for correcting a color that improve the convenience by displaying an actual taken image and an image displayed on a display device in same colors.

According to the first aspect of the present invention, a user terminal includes:
a camera that takes an image of an object;
a display device that displays the object;
a color reference data extraction unit that extracts color image data output when the camera takes an image of a color sample as a color reference provided on the object;
a color comparison unit that compares the extracted color image data with the color of an original color sample; and
a color correction unit that corrects the color of the object displayed on the display device as a result of a comparison by the comparison unit.

According to the first aspect of the present invention, a user terminal includes a camera that takes an image of an object; a display device that displays the object; extracts color image data output when the camera takes an image of a color sample as a color reference provided on the object; compares the extracted color image data with the color of an original color sample; and corrects the color of the object displayed on the display device as a result of a comparison.

The first aspect of the present invention is the category of a user terminal, but the categories of a method for correcting a color and a program for a user terminal have the same functions and effects.

According to the second aspect of the present invention, the user terminal according to the first aspect of the present invention further includes a color sample projection unit that projects the color sample on the object imaged by the camera.

According to the second aspect of the present invention, the user terminal according to the first aspect of the present invention projects the color sample on the object imaged by the camera.

According to the third aspect of the present invention, in the user terminal according to the first or the second aspect of the present, the color comparison unit compares the RGB value of the color image data with the RGB value of the color of the original color sample.

According to the third aspect of the present invention, the user terminal according to the first or the second aspect of the present invention compares the RGB value of the color image data with the RGB value of the color of the original color sample.

According to fourth aspect of the present invention, a system for correcting a color includes:
a camera that takes an image of an object;
a display device that displays the object;
a color reference data extraction unit that extracts color image data output when the camera takes an image of a color sample as a color reference provided on the object;
a color comparison unit that compares the extracted color image data with the color of an original color sample; and
a color correction unit that corrects the color of an object displayed on the display device as a result of a comparison by the comparison unit.

According to the fourth aspect of the present invention, a system for correcting a color includes a camera that takes an image of an object; a display device that displays the object; extracts color image data output when the camera takes an image of a color sample as a color reference provided on the object; compares the extracted color image data with the color of an original color sample; and corrects the color of an object displayed on the display device as a result of a comparison.

According to the fifth aspect of the present invention, a method for correcting a color executed by a camera that takes an image of an object and a display device that displays the object includes the steps of:
extracting color image data output when the camera takes an image of a color sample as a color reference provided on the object;
comparing the extracted color image data with the color of an original color sample; and
correcting the color of an object displayed on the display device as a result of a comparison.

The present invention can provide a user terminal and a system and a method for correcting a color that improve the convenience by displaying an actual taken image and an image displayed on a display device in same colors.

DESCRIPTION OF EMBODIMENTS

Embodiments of the present invention will be described with reference to the attached drawings. However, this is illustrative only, and the technological scope of the present invention is not limited thereto.

Outline of System for Correcting Color 1

Figure 1:
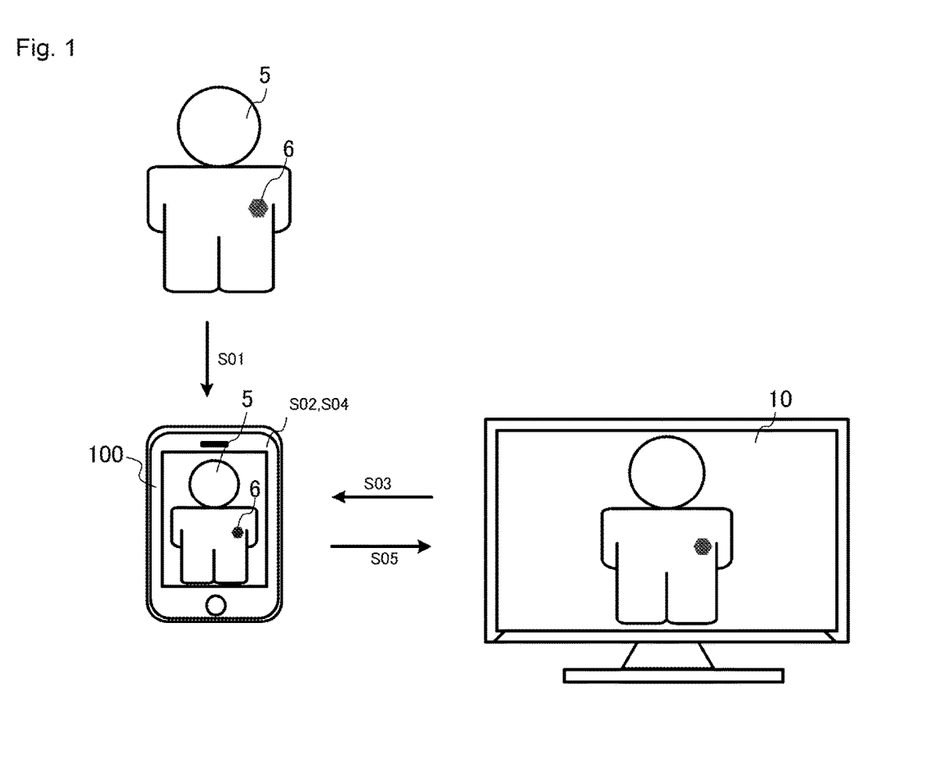
FIG. 1 conceptually shows the system for correcting a color 1.

FIG. 1 shows the overall view of the system for correcting a color 1 according to a preferable embodiment of the present invention. The system for correcting a color 1 includes a user terminal 100, an object 5, a color sample for an object 6, a television 10, and a reference color sample 7.

In the system for correcting a color 1, the user terminal 100 may be communicatively connected with the television 100 through LAN or a public line network such as the Internet or through a cable. The user terminal 100 has a camera that takes an image of an object 5 and a display device that displays the taken image.

In the system for correcting a color 1, the user terminal 100 first takes an image of an object 5 with an imaging device such as the own camera (step S01). This object 5 is provided with a color sample for an object 6 to be described later.

In the step S01, the user terminal 100 projects a color sample for an object 6 from the imaging device on an object 5 and take an image of the object 5 and the color sample for an object 6.

The user terminal 100 extracts the color sample for an object 6 from the image data of the object 5 (step S02). In the step S02, the user terminal 100 extracts the RGB value of each color of the color sample for an object 6.

Then, the user terminal 100 takes an image of a reference color sample 7 displayed on the television 10 by using the imaging device and acquires the image data of the reference color sample 7 (step S03).

The user terminal 100 extracts the RGB value of each color from the acquired image data of the reference color sample (step S04).

The user terminal 100 compares the RGB value of each color of the color sample for an object with that extracted from the image data of the reference color sample and corrects the RGB value of each color of the color sample for an object to that from the image data of the reference color sample (step S05). In the step S05, for example, the user terminal 100 identifies each color of the color sample for an object based on the RGB value of adjacent colors extracted from the image data of the reference color sample or the arrangement of colors from the image data of the reference color sample and corrects the RGB value of each color of the color sample for an object to the RGB value of each color from the image data of the reference color sample.

The user terminal 100 corrects the RGB value of each color from the image data of the object 5 based on the corrected RGB value of each color of the color sample for an object and outputs the corrected RGB values to the television 10 as the corrected image data (step S05).

The television 10 displays a corrected taken image based on the corrected image data output from the user terminal 100.

In this embodiment, the user terminal 100 includes an imaging device that takes an image of an object 5 and a display that displays an image taken by the imaging device. However, the imaging device may be separated from the user terminal 100.

In this case, for example, the imaging device only has to take an image of an object 5 and transmits the image data to the user terminal 100. Then, the user terminal 100 only has to display the taken image based on the image data.

System Configuration of System for Correcting a Color 1

Figure 2:
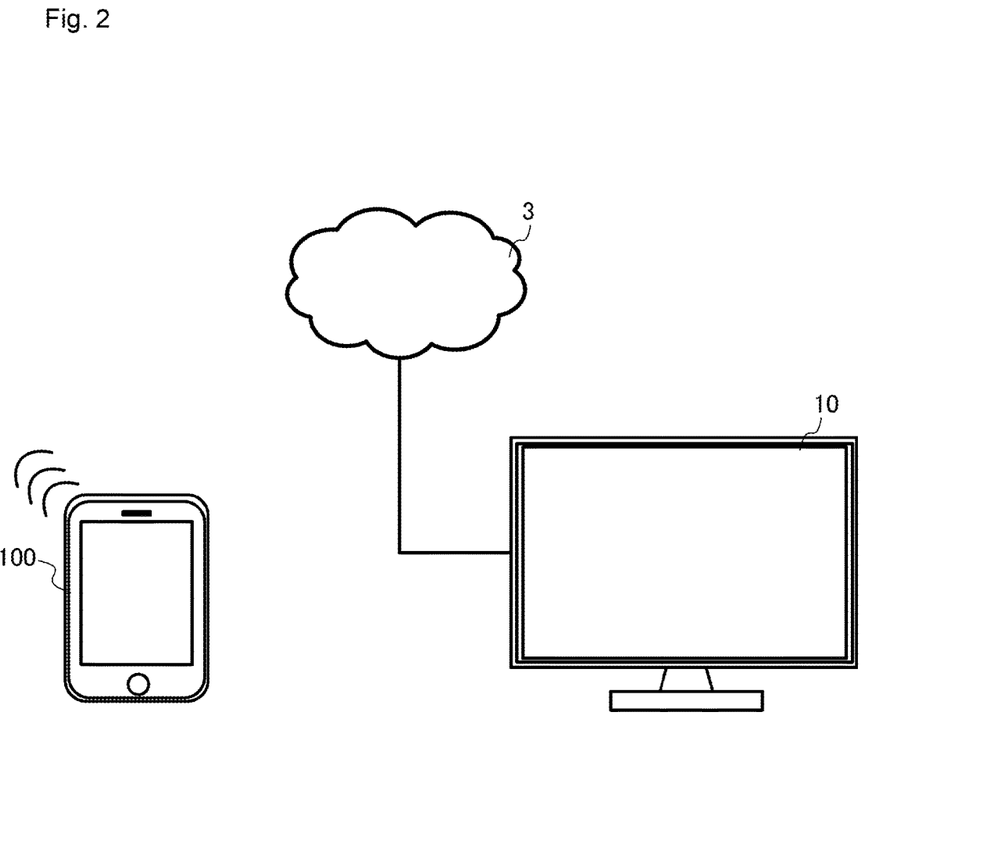
FIG. 2 shows an overall configuration of the system for correcting a color 1.

FIG. 2 is a block diagram illustrating the system for correcting a color 1 according to a preferable embodiment of the present invention. The system for correcting a color 1 includes a user terminal 100, a television 10, and a public line network 3 (e.g. the Internet network, a third or a fourth generation network).

The user terminal 100 has the functions to be described later, which is communicatively connected with the television 10.

The television 10 is a general television receiver, which is communicatively connected with the user terminal 100 to display data transmitted from the user terminal 100.

Functions

Figure 3:
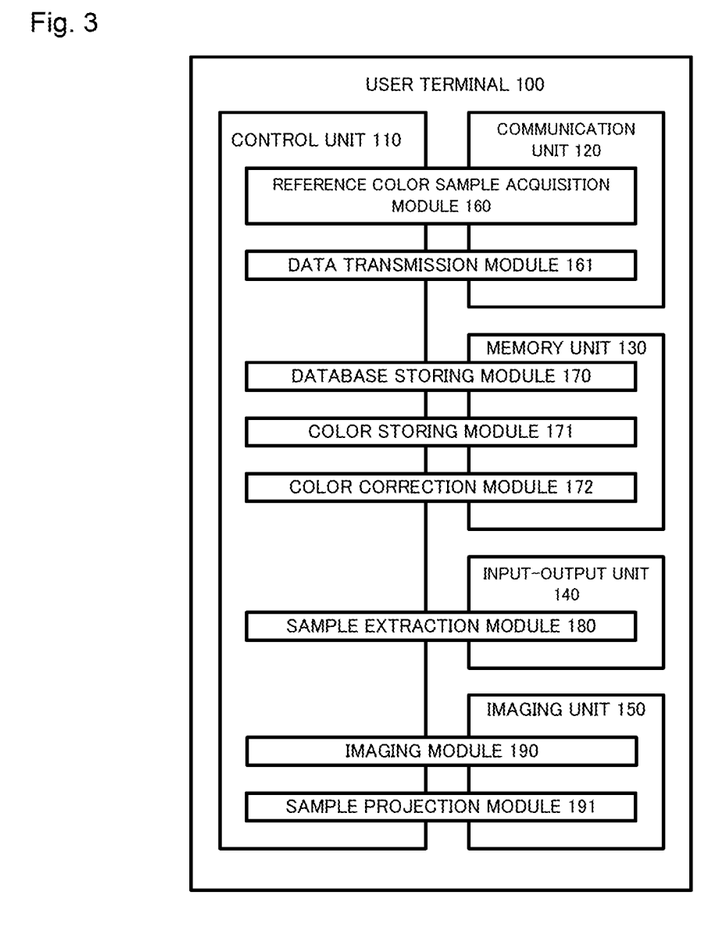
FIG. 3 is a functional block diagram of the user terminal 100.

FIG. 3 is a functional block diagram of the user terminal 100 to show the relationship among the functions.

The user terminal 100 includes a control unit 110 including a central processing unit (hereinafter referred to as "CPU"), a random access memory (hereinafter referred to as "RAM"), and a read only memory (hereinafter referred to as "ROM"); and a communication unit 120 including a Wireless Fidelity or Wi-Fi® enabled device complying with, for example, IEEE 802.11, or a wireless device complying with the IMT-2000 standard such as the third generation mobile communication system. The communication unit may include a wired device for LAN connection.

The user terminal 100 also includes a memory unit 130 such as a hard disk, a semiconductor memory, a recording medium, or a memory card to store data. The memory unit 130 includes a color database to be described later.

The user terminal 100 also includes an input-output unit 140 including a display unit outputting and displaying data and images that have been processed by the control unit 110; and a touch panel, a keyboard, and a mouse that receive an input from a user. Furthermore, the user terminal 100 has a clock function to acquire the time, a location information acquisition device, and various sensors that acquires the altitude, the signal intensity, the inclination, and the acceleration, etc.

The user terminal 100 also includes an imaging unit 150 such as an imaging device taking still and moving images, etc., and a lens. In the user terminal 100, the control unit 110 reads a predetermined program to run a reference color sample acquisition module 160 and a data transmission module 161 in cooperation with the communication unit 120. Furthermore, in the user terminal 100, the control unit 110 reads a predetermined program to run a database storing module 170, a color storing module 171, and a color correction module 172 in cooperation with the memory unit 130. Still furthermore, in the user terminal 100, the control unit 110 reads a predetermined program to run a sample extraction module 180 in cooperation with the input-output unit 140. Yet furthermore, in the user terminal 100, the control unit 110 reads a predetermined program to run an imaging module 190 and a sample projection module 191 in cooperation with the imaging unit 150.

Chromatic Correction Process

Figure 4:
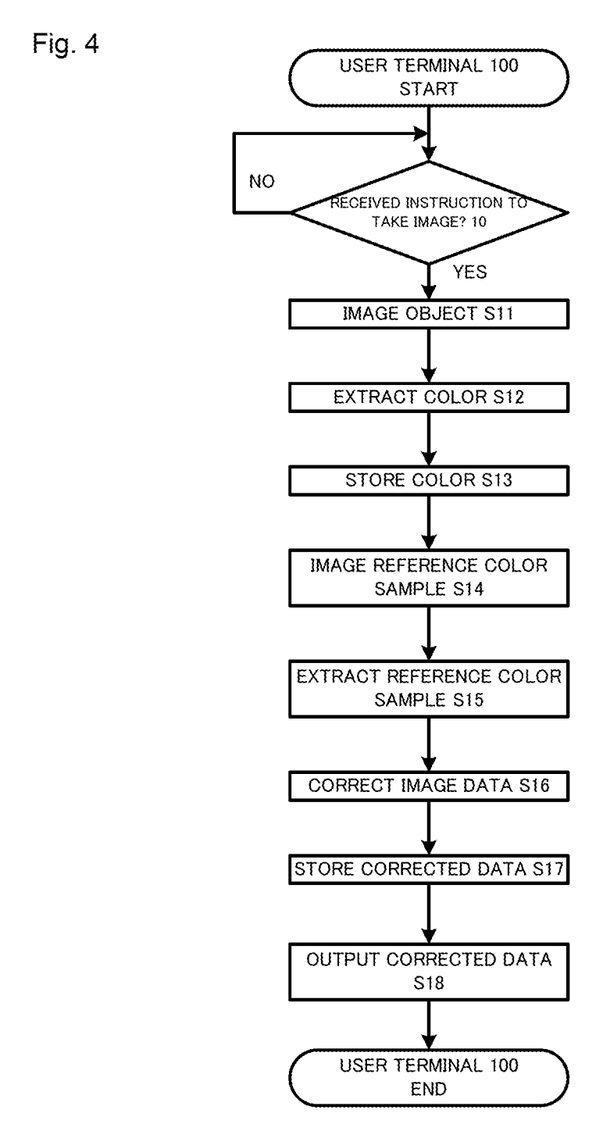
FIG. 4 is a flow chart of the chromatic correction process executed by the user terminal 100.

FIG. 4 is a flow chart of the chromatic correction process executed by the user terminal 100 according to a preferable embodiment of the present invention. The tasks executed by the modules will be described below with this process.

First, the imaging module 190 of the user terminal 100 judges whether or not the imaging module 190 has received an instruction to take an image of an object 5 (step S10). In the step S10, if judging that the imaging module 190 has not received an instruction to take an image of an object 5 (NO), the imaging module 190 repeats this process until receiving an instruction to take an image.

Figure 5:
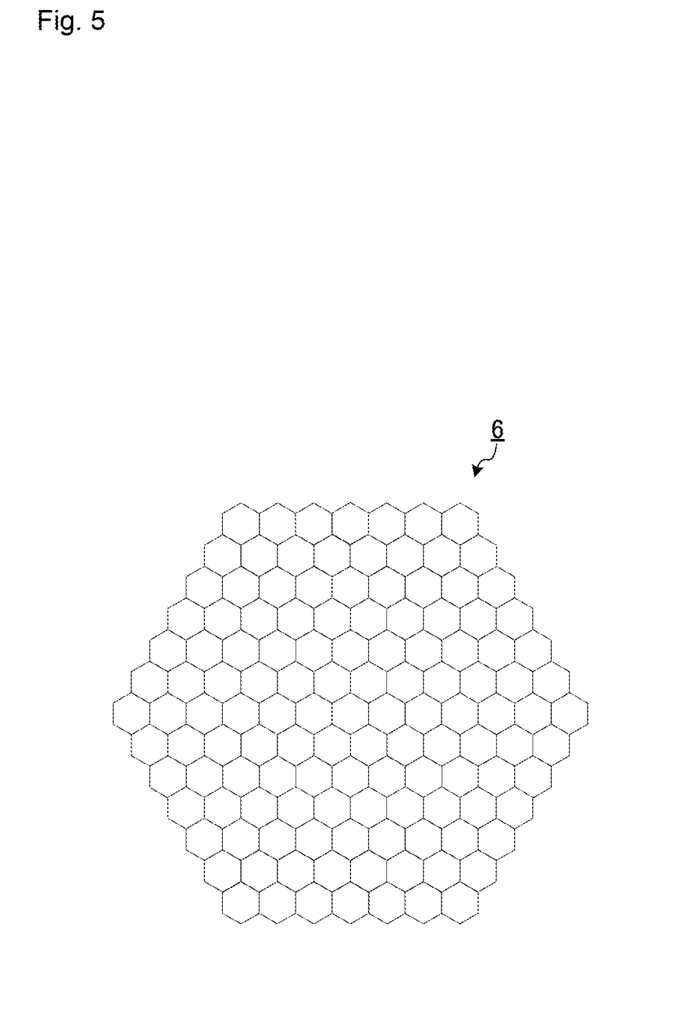
FIG. 5 shows a color sample for an object 6.
Figure 6:
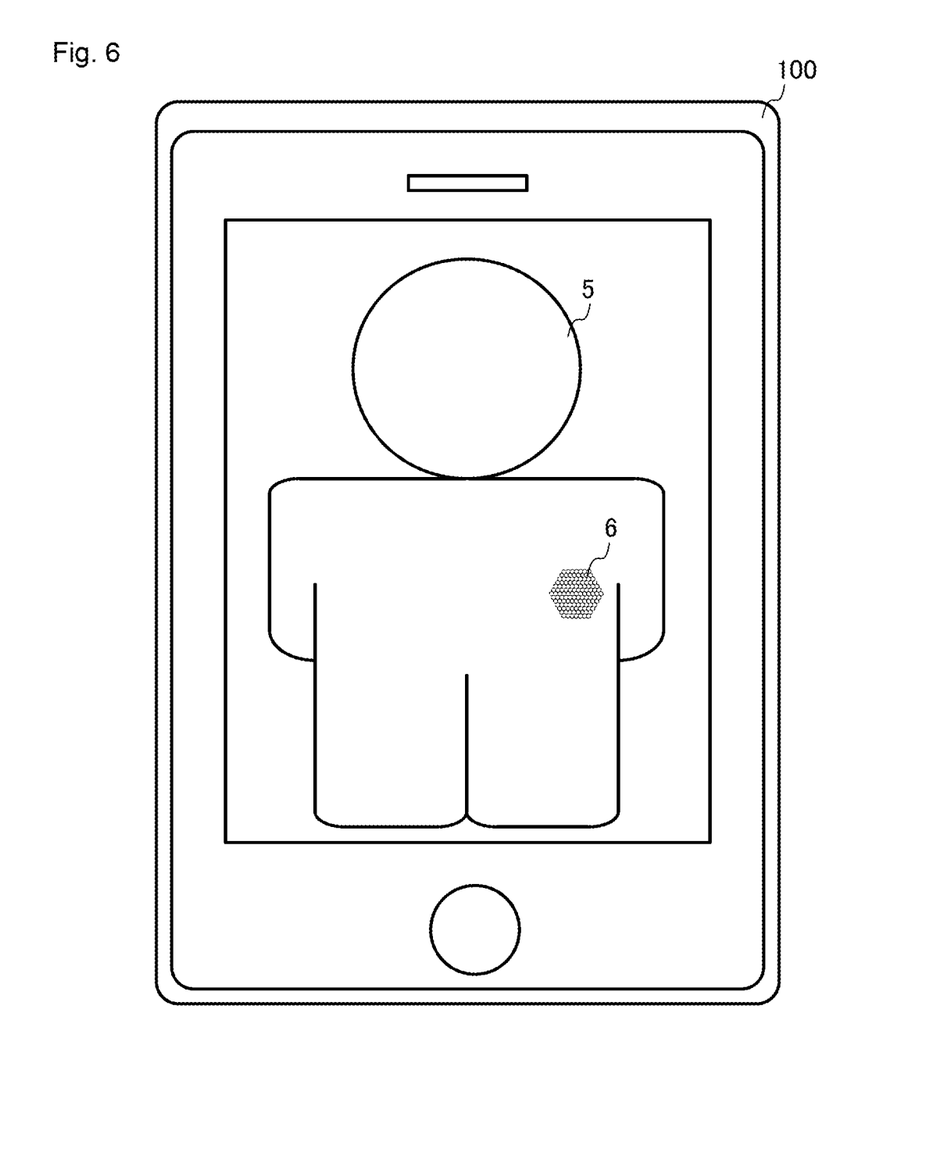
FIG. 6 shows an object 5 and a color sample for an object 6 that are displayed on the user terminal 100.

On the other hand, if judging whether the imaging module 190 has received an instruction to take an image of an object 5 (YES), the imaging module 190 of the user terminal 100 takes an image of an object 5 (step 11). In the step S11, the sample projection module 191 of the user terminal 100 projects the color sample for an object 6 that is shown in FIG. 5 on an object 5. Specifically, the imaging module 190 takes an image of not only an object 5 but also a color sample for an object 6 as shown in FIG. 6. The color sample for an object 6 may not be projected on an object 5 by the sample projection module 191 and may be directly provided on an object 5.

Color Sample for Object 6

FIG. 5 shows the color sample for an object 6 that is projected on an object 5 by the sample projection module 191 of the user terminal 100. The color sample for an object 6 has a honeycomb color pattern with more than one cell in this embodiment. The color sample for an object 6 has one color in each cell. In the color sample for an object 6, each cell has a different RGB value. The database storing module 170 of the user terminal 100 stores the RGB value of the each cell in a color database. The size, the number, etc., of the cells can be changed as appropriate. In this case, the size of the cells only has to enable the sample extraction module 180 to be described later of the user terminal 100 to recognize the image of a color sample for an object 6 imaged by the imaging module 190 of the user terminal 100 and to extract the RGB value of each cell.

Color Database

Figure 7:
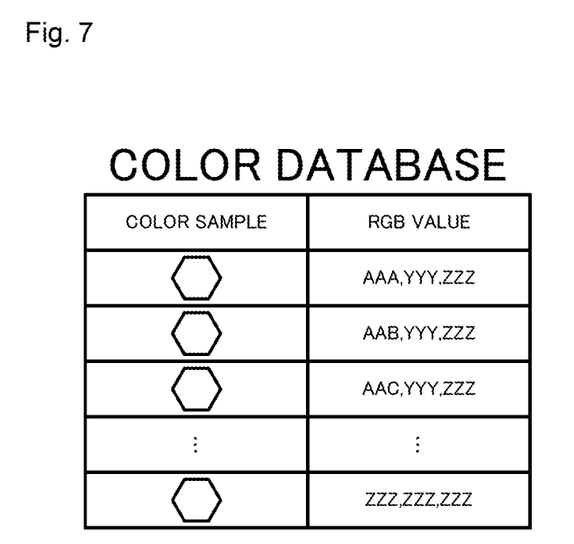
FIG. 7 shows a color database stored in the user terminal 100.

The database storing module 170 of the user terminal 100 stores the RGB value of each cell in the color database shown in FIG. 7. In this embodiment, the database storing module 170 stores and associates a cell with an RGB value in a database. The database storing module 170 may associate and store not a cell itself but other data such as a number indicating the location of a cell or a cell number in a database.

Then, the sample extraction module 180 of the user terminal 100 extracts the color sample for an object 6 from the image data of an object 5 imaged by the imaging module 190 of the user terminal 100 (step S12). In the step S12, the sample extraction module 180 extracts the color of each cell of the color sample for an object 6 that is included in the image data, based on the color database, referring to the RGB value of each cell.

The color storing module 171 of the user terminal 100 stores the color of each cell that is extracted by the sample extraction module 180 of the user terminal 100 in the step S12 (step S13).

Figure 8:
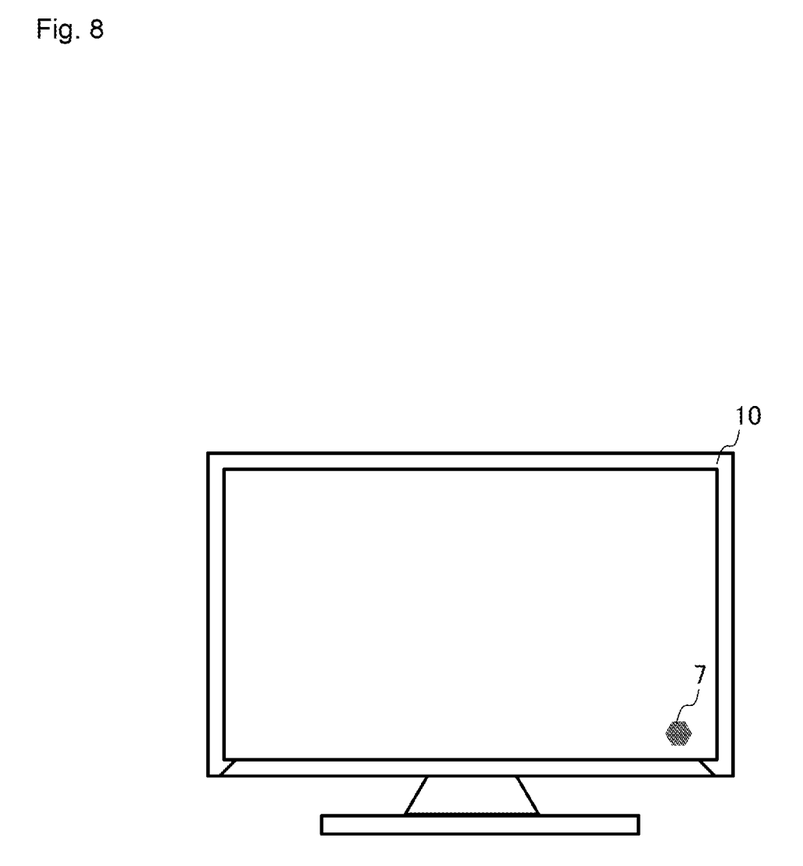
FIG. 8 shows a reference color sample 7 displayed on a television 10.

Then, the imaging module 190 of the user terminal 100 takes an image of a reference color sample 7 displayed on the television 10 shown in FIG. 8 (step S14). In the step S14, the television 10 may acquire the reference color sample 7 from a database to display by itself, a server, etc., through a public line network 3 or may display its own reference color sample 7. The reference color sample 7 imaged by the imaging module 190 is similar to the above-mentioned color sample for an object 6. In the step S14, the size, the location of each cell, etc., of the reference color sample 7 displayed on the television 10 can be changed as appropriate in the same way as the above-mentioned color sample for an object 6.

Then, the sample extraction module 180 of the user terminal 100 extracts the RGB value of each cell of the reference color sample 7 based on the image data of the reference color sample 7 imaged by the imaging module 190 of the user terminal 100 (step S15). In the step S15, the sample extraction module 180 extracts the RGB value of the color of each cell by recognizing the image of each cell.

The color correction module 172 of the user terminal 100 corrects the color of each cell of the color sample for an object 6 stored by the color storing module 171 to the color of each cell that is extracted from the image data of the reference color sample 7 (step S16). In the step S16, the color correction module 172 compares each color of the color sample for an object with that of the reference color sample 7, both which are extracted by the sample extraction module 180 of the user terminal 100, and corrects the RGB value of each color of the color sample for an object to that of the reference color sample 7. For example, the color correction module 172 identifies each color of the color sample for an object 6 based on the RGB values of adjacent colors that are extracted from the image data of the reference color sample 7 or the arrangement of colors from the image data of the reference color sample 7 and corrects the RGB value of each color of the color sample for an object to the RGB value of each color from the image data of the reference color sample.

In the step S16, the color correction module 172 of the user terminal 100 corrects RGB values in all the pixels of the image data.

The database storing module 170 of the user terminal 100 stores the RGB values corrected in the step S16 in the color database as the RGB values of each color sample (step S17). In the step S17, the database storing module 170 may store the corrected RGB values of a color sample by overwriting the existing RGB values of a color sample with the corrected RGB values of a color sample or may store the corrected RGB values of a color sample as another color database.

The data transmission module 161 of the user terminal 100 transmits the corrected image data which is the taken image with colors corrected in the step S16 to the television 10 (step S18). In the step S18, the data transmission module 161 may transmit the image data of only an object 5, i.e., with a color sample for an object 6 being removed, to the television 10. In this case, the user terminal 100 only has to remove a color sample for an object 6 by correcting the image data in the location of a color sample for an object 6.

Figure 9:
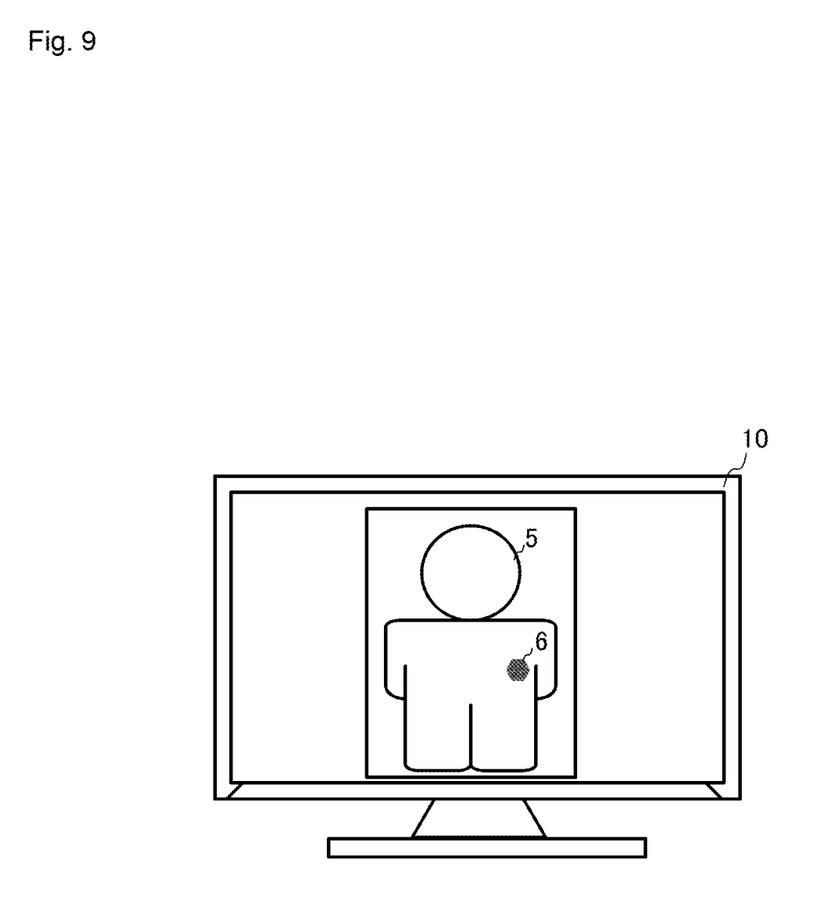
FIG. 9 shows a corrected image displayed on a television 10.

The television 10 displays the corrected taken image shown in FIG. 9 on itself.

In this embodiment, the user terminal 100 includes an imaging device that takes an image of an object 5 and a display that displays an image taken by the imaging device. However, the imaging device may be separated from the user terminal 100.

In this case, for example, the imaging device only has to take an image of an object 5 and transmits the image data of the taken image to the user terminal 100. Then, the user terminal 100 only has to display the taken image based on the image data of the taken image.

To achieve the means and the functions that are described above, a computer (including CPU, an information processor, and various terminals) reads and executes a predetermined program. For example, the program is provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for correcting color
5 Object
6 Color sample for an object
7 Reference color sample
10 Television
100 User terminal

What is claimed is:

1. A user terminal comprising:
   a color sample projection unit that projects an original color sample on an object;
   a camera that takes an image of the object on which the original color sample is projected and takes an image of a reference color sample displayed on a display device;
   a color reference data extraction unit that extracts color image data from the image of the reference color sample, as a color reference provided on the object, and extracts a color of the original color sample from the image of the object on which the original color sample is projected;
   a color comparison unit that compares the color image data extracted by the color reference data extraction unit with the color of the original color sample extracted by the color reference data extraction unit; and
   a color correction unit that corrects colors of the object displayed on the display device as a result of a comparison by the color comparison unit.

2. The user terminal according to claim 1, wherein the color comparison unit compares RGB values of the color image data with RGB values of the color of the original color sample.

3. A system for correcting a color, comprising:
   a color sample projection unit that projects an original color sample on an object;
   a camera that takes an image of the object on which the original color sample is projected and takes an image of a reference color sample displayed on a display device;
   a display device that displays the object;
   a color reference data extraction unit that extracts color image data from the image of the reference color sample, as a color reference provided on the object, and extracts a color of the original color sample from the image of the object on which the original color sample is projected;
   a color comparison unit that compares the color image data extracted by the color reference data extraction unit with the color of the original color sample extracted by the color reference data extraction unit; and
   a color correction unit that corrects colors of the object displayed on the display device as a result of a comparison by the color comparison unit.

4. A method for correcting a color executed by a camera that takes an image of an object and a display device that displays the object, comprising:
   projecting an original color sample on an object;
   taking an image of the object on which the original color sample is projected;
   taking an image of a reference color sample displayed on the display device;
   extracting a color of the original color sample from the image of the object on which the original color sample is projected;
   extracting color image data from the image of the reference color sample, as a color reference provided on the object;
   comparing the extracted color image data with the extracted color of the original color sample; and
   correcting colors of the object displayed on the display device as a result of a comparison.

5. The system according to claim 3, wherein the color comparison unit compares RGB values of the color image data with RGB values of the color of the original color sample.

6. The method according to claim 4, wherein comparing the extracted color image data includes comparing RGB values of the color image data with RGB values of the color of the original color sample.

* * * * *